(12) United States Patent
Holtgraver et al.

(10) Patent No.: US 9,464,719 B2
(45) Date of Patent: Oct. 11, 2016

(54) SEAL ASSEMBLY FOR USE IN HARSH ENVIRONMENTS

(75) Inventors: Edward Holtgraver, Tomball, TX (US); James Howard, Tomball, TX (US)

(73) Assignee: QTRCO, Inc., Tomball, TX (US)

( * ) Notice: Subject to any disclaimer, the term of this patent is extended or adjusted under 35 U.S.C. 154(b) by 903 days.

(21) Appl. No.: 13/526,866

(22) Filed: Jun. 19, 2012

(65) Prior Publication Data

US 2013/0333554 A1    Dec. 19, 2013

(51) Int. Cl.
| | |
|---|---|
| *F16J 15/16* | (2006.01) |
| *F16J 15/26* | (2006.01) |
| *F16J 1/00* | (2006.01) |
| *F16J 15/22* | (2006.01) |
| *F16J 15/18* | (2006.01) |
| *F16J 15/02* | (2006.01) |

(52) U.S. Cl.
CPC .............. *F16J 15/26* (2013.01); *F16J 1/005* (2013.01); *F16J 1/006* (2013.01); *F16J 1/008* (2013.01); *F16J 15/028* (2013.01); *F16J 15/184* (2013.01); *F16J 15/186* (2013.01); *F16J 15/22* (2013.01); *Y10T 29/49249* (2015.01)

(58) Field of Classification Search
CPC ............ F16J 5/025; F16J 1/005; F16J 1/006; F16J 1/008; F16J 15/028; F16J 15/186; F16J 15/3288; F16J 15/22; F16J 15/184
USPC ........................................................ 92/252
See application file for complete search history.

(56) References Cited

U.S. PATENT DOCUMENTS

| | | | | |
|---|---|---|---|---|
| 2,321,160 | A * | 6/1943 | Schnitzer ......................... 92/206 |
| 3,188,099 | A * | 6/1965 | Johnson et al. ............... 277/437 |
| 3,646,846 | A * | 3/1972 | Houghton et al. .................. 87/1 |
| 5,460,251 | A * | 10/1995 | Jeffries ...................... 188/282.1 |
| 8,904,782 | B2 * | 12/2014 | Gohr et al. ...................... 60/588 |

* cited by examiner

*Primary Examiner* — Logan Kraft
(74) *Attorney, Agent, or Firm* — Bushman Werner, P.C.

(57) ABSTRACT

A sealing assembly, for example a piston ring, for use in harsh environments, e.g., high radiation levels. The piston ring has an annular sealing surface which together with a member forming a radially outer annular cylinder surface, e.g., a cylinder, forms a seal pocket. Received in the seal pocket is an annular seal comprised of a plurality of wraps of at least one strand of a substantially incompressible and inelastic material such as graphite fiber. The assembly further includes a compression ring and compression assembly which compresses the seal body between the support surface and the compression ring to displace the seal body into sealing engagement with the radially inner and outer sealing surfaces.

17 Claims, 3 Drawing Sheets

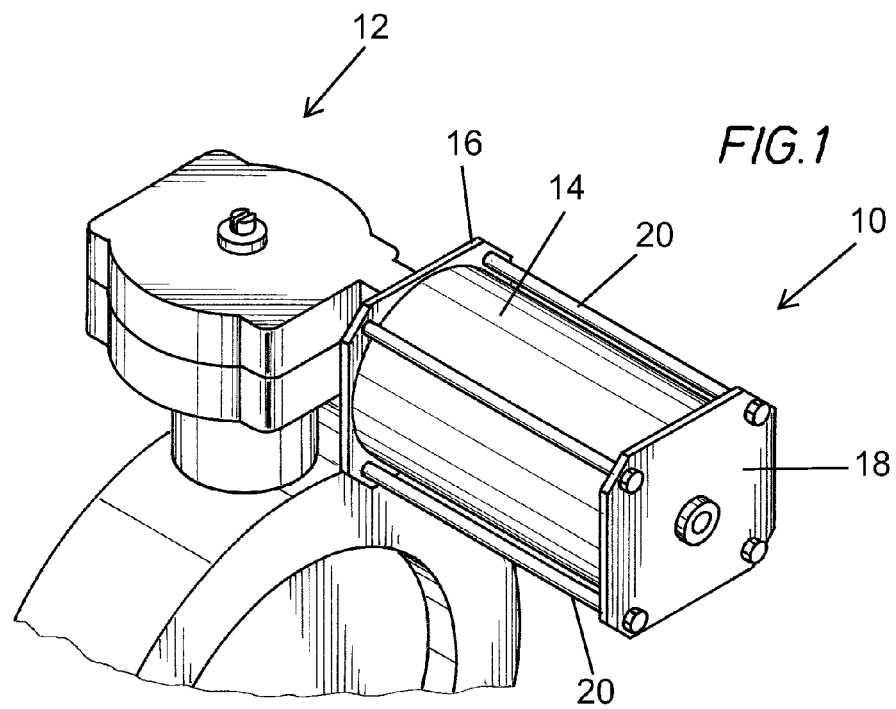
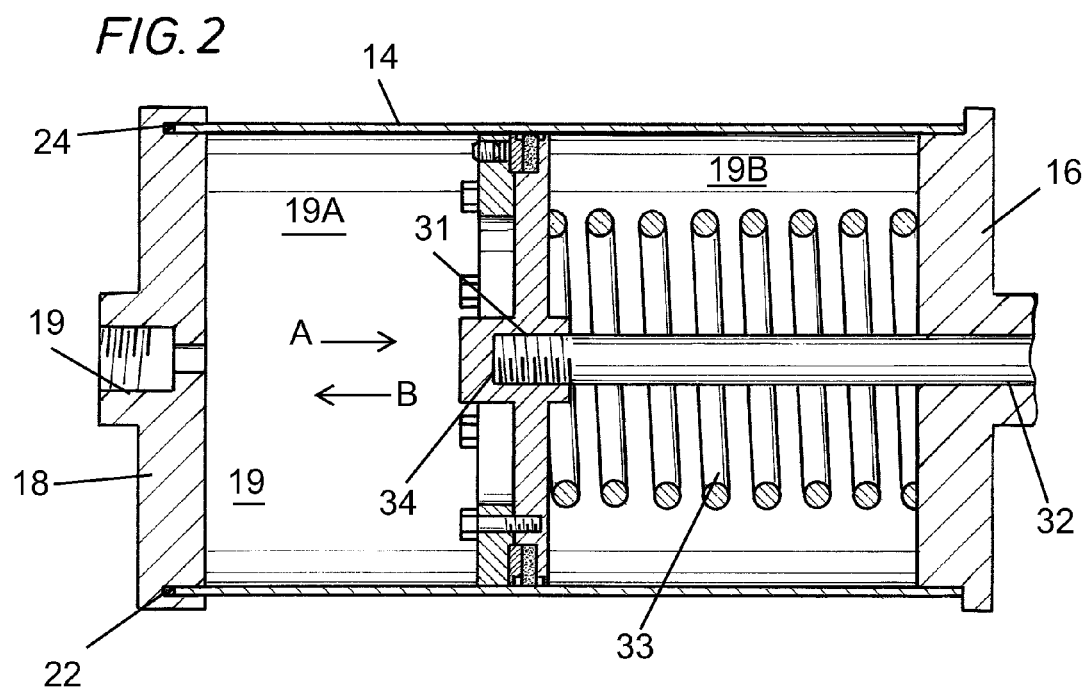

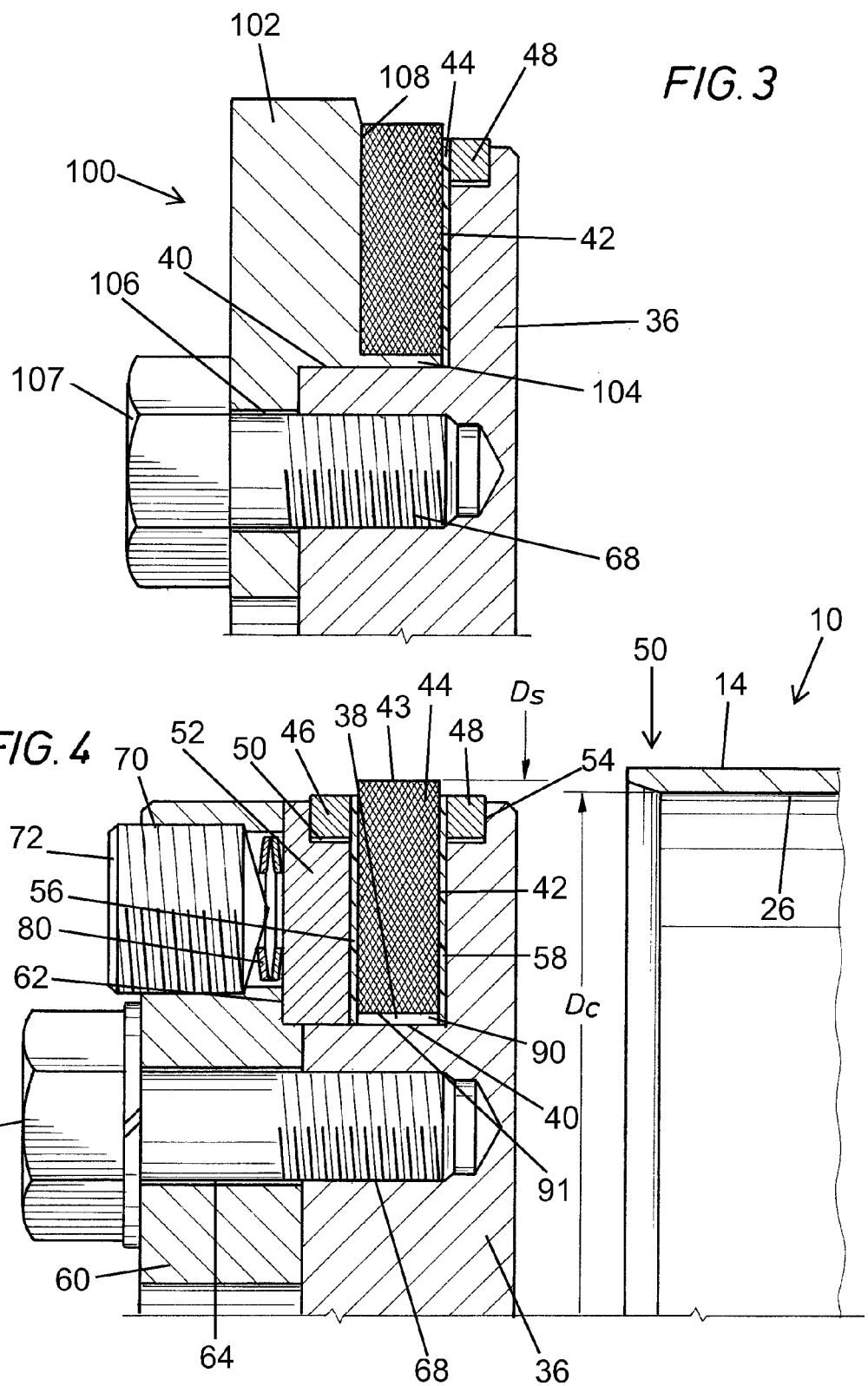

SEAL ASSEMBLY FOR USE IN HARSH ENVIRONMENTS

FIELD OF THE INVENTION

The present invention relates to seals, seal assemblies and actuators for use in harsh environments and to a method for forming seals for use in harsh environments.

BACKGROUND OF THE INVENTION

There are many applications in industry that require seals and sealing assemblies which can withstand harsh environments such as extreme heat or cold, chemical attack, and exposure to high radioactivity levels. In most of these environments, elastomeric seals, plastic seals and even composite seals cannot be employed.

Currently there are available materials such as graphite or carbon fiber, aluminum silicate based refractory fiber, etc. which can be used in certain of these harsh environments. It is to be understood that while certain materials may be used in one harsh environment, e.g., extremely high temperatures it may not be suitable in another harsh environment, e.g., exposure to high radiation levels.

Graphite or carbon fiber seals are commonly used as both static and dynamic seals in equipment, e.g., pumps, valves, actuators used in nuclear facilities, e.g., braided stem packing for valves in a nuclear power plant where it is practical to apply high forces to cause desired sealing or static seals between two fixed surfaces. Dynamic seals typically employ chevron shaped compressed foil type or braided packing rings. Both types require considerable compressive forces to effect a dynamic seal, with the coarse surface of the braided rings requiring considerably more than the compressed foil types due to the unevenness of their surfaces. Both impart a great deal of friction with the stem and body but not so high as to negate their severe service capabilities. However should one desire to use these materials to seal between the piston an cylinder bore of an actuator, the high friction caused by the necessary compressive forces renders the concept unusable as the actuator loses an excessive amount of output force or torque.

While it has been postulated that a carbon or graphite braid made of very fine fibers would provide dynamic sealing without excessive compressive force, to date, such fine braided packings are not available.

SUMMARY OF THE INVENTION

In one aspect, the present invention provides a seal made of a substantially incompressible and inelastic material which can be used to effect sealing between relatively movable members without excessive compressive force needed to force the seal into contact with the sealing surfaces on the members.

In another aspect, there is provided a method for making a seal from a substantially inelastic and incompressible material which is effective in dynamic and/or static sealing applications.

In yet another aspect, the present invention provides a sealing assembly for use in dynamic applications, e.g., between relatively rotating or sliding members.

In still another aspect, the present invention provides an actuator having a seal formed of a substantially inelastic and incompressible material which can be used in harsh environments such as, for example, nuclear power plants and other facilities where high radiation levels cause degradation of most materials used for making seals or for applications where fire may occur, melting or otherwise destroying the sealing ability of less suitable seal materials.

These and further features and advantages of the present invention will become apparent from the following detailed description, wherein reference is made to the figures in the accompanying drawings.

BRIEF DESCRIPTION OF THE DRAWINGS

FIG. 1 is a partial, isometric view of an actuator in accordance with one aspect of the present invention attached to a valve.

FIG. 2 is an elevational view, partly in section of the actuator shown in FIG. 1.

FIG. 3 is an elevational view, partly in section showing a portion of the piston ring assembly shown in FIG. 4 used in making a seal according to one aspect of the present invention.

FIG. 4 is an elevational view, partly in section of a piston ring assembly and cylinder in accordance with one aspect of the present invention.

DETAILED DESCRIPTION OF PREFERRED EMBODIMENTS

Figure 5:
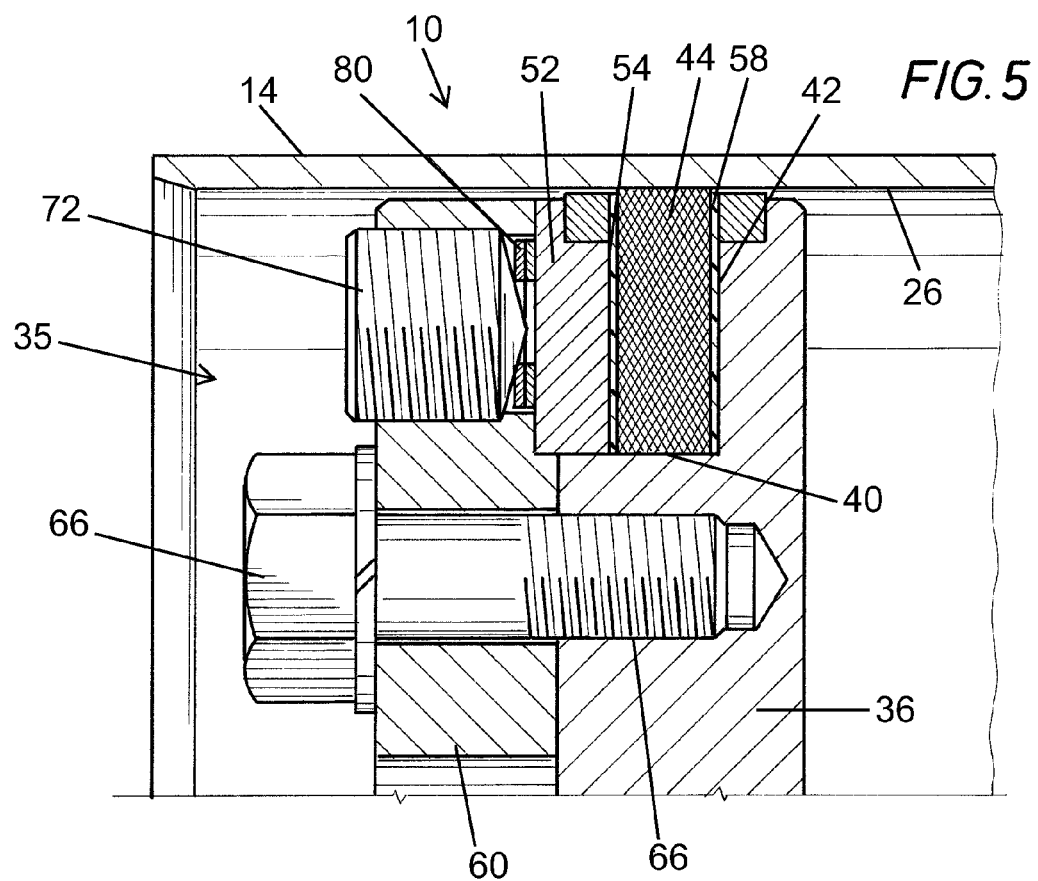
FIG. 5 is a view similar to FIG. 4 showing the piston ring assembly of FIG. 4 positioned in the cylinder.

As used herein, the term "operatively" or "operative to," "operatively connected" or similar terms, means that one part(s) can or does act upon another part(s), directly or indirectly, to achieve a desired result. The term "strand" as used herein is intended to mean a single, thin length of a material such as a thread, fiber, or filament as well as a number of fibers, threads or yarns plaited or twisted together to form a strand.

While the invention will be described with particular reference to a seal, a seal assembly and an actuator for use in an environment subjected to high radiation levels, it is to be understood it is not so limited. The present invention is applicable to any sealing application, particularly dynamical sealing applications involving harsh conditions such as excessively high and/or low temperatures, chemical attack, etc.

Turning first to FIG. 1, there is shown a partial, isometric view of a valve having an actuator according to the present invention attached thereto. The actuator, shown generally as 10, is attached to a valve shown generally as 12 which can be any of a variety of valves, including butterfly valves, ball valves, etc. While not limited, actuator 10 can be of the type disclosed in U.S. Pat. No. 8,087,316, the disclosure of which is incorporated herein by reference for all purposes.

Referring now to FIG. 2, the actuator 10 is shown in greater detail. Actuator 10 comprises a cylindrical housing 14, a first end cap 16, and a second end cap 18 which collectively form a generally cylindrical chamber 19. As best seen in FIG. 1, housing 14 is compressed between end caps 16 and 18 by a series of nut/bolt combinations 20. End cap 18 is provided an annular groove 22 in which is received one end of housing 14, an annular gasket 24 being disposed in groove 22 to effect sealing between end cap 18 and housing 14. In this regard, it will be understood that gasket 24 will be made of substantially the same material as the seal as described more fully hereafter. The wall of chamber 19 forms an annular, radially outermost facing sealing surface 26.

Reciprocally mounted in chamber 19 formed by housing 14 is a piston assembly shown generally as 28 which is secured to a piston rod 30, piston rod 30 being secured in a blind, threaded bore 31 formed in a hub 34 of piston assembly 28 and extending through an opening 32 in end cap 16 and connected, in a well known fashion, to a shaft or the like, which in turn is connected, for example, to a valve element of a valve, such as valve 12, whereby as piston rod 30 is reciprocated in and out of opening 32 of actuator 10, the shaft, and hence the valve element, is caused to rotate between open, closed or intermediate positions.

As shown, actuator 10 is of the spring return type. Accordingly, when a suitable fluid is introduced into chamber portion 19A of chamber 19, so as to act against piston assembly 28 and force piston assembly 28 and hence piston rod 30 in the direction of arrow A. This will of course compress spring 33 in a direction toward end cap 16. Upon release of pressure in chamber portion 19A, spring 33 will then move piston assembly 28 in the direction of arrow B, i.e., toward end cap 18. Spring assembly 33 shown in FIG. 2 is only one of many types of spring assemblies which could be employed as is well known to those skilled in the art.

Referring now to FIG. 4, it can be seen that a hub 34 can be integrally formed on an annular piston body 36. Piston body 36, as best seen in FIG. 4, has an annular, peripherally extending recess 38 formed by an annular, axially extending, radially outwardly facing wall 40 and an annular, radially extending, axially facing support surface 42. Positioned in recess 38 is an annular seal member 44, described more fully hereafter. Seal member 44 is disposed between annular, upper and lower anti-extrusion rings 46 and 48, upper anti-extrusion ring 46 being received in an annular peripherally extending recess 50 formed in a compression ring 52, lower anti-extrusion ring 48 being received in an annular peripheral recess 54 also formed in the outer periphery of piston body 36.

Compression ring 52, as seen, is received in recess 38 on piston body 36, compression ring 52 having an ID substantially the same as the OD defined by annular, axially extending wall 40. There is a retainer ring 60 having an annular peripheral recess 62 whereby retainer ring 60 can receive a portion of compression ring 52 while at the same time being positioned against the upper surface of piston body 36.

Retainer ring 60 has a plurality of circumferentially displaced bolt holes 64 for receipt of bolts 66 which are threadedly received in registering threaded bores 68 formed in piston body 36. Retainer ring 60 is also provided with a plurality of threaded bores 70 for receipt of set screw 72. Positioned in each of bores 70, between set screws 72 and compression ring 52 is a pair of series stacked Bellville springs 80. While the Bellville springs 80 are not strictly necessary, they offer the advantage of providing high spring loads while at the same time being substantially immune to problems occasioned by vibration, differential thermal expansion and/or bolt creep.

As discussed above, the seal rings of the present invention are formed by a plurality or series of wraps or windings of at least one strand of a substantially inelastic and incompressible material, e.g., graphite fibers, carbon fibers, ceramic fibers, etc. as opposed to elastomeric, plastic, PTFE, or other such materials from which certain types of seals are made. Because the materials from which the seal rings of the present invention are made are inelastic and incompressible, they cannot, by prior art methods, be simply placed in a seal ring pocket and urged, by compression into sealing engagement with the surfaces against which they are designed to seal. The present invention addresses and overcomes that problem.

Referring again to FIG. 4, it can be seen that the portion of FIG. 4 depicting one end of housing 14 has an inside diameter $D_c$, that diameter being defined by the circumference of sealing surface 26 of chamber 19 formed in housing 14. In contrast, piston assembly 28, as shown in FIG. 4, has an outside diameter $D_s$ defined by the outer peripheral surface of seal ring 44. In other words, as seen, prior to assembly, the outer circumference 43 of seal ring 44 is larger than the circumference defined by sealing surface 26. However, as can also be seen in FIG. 4, prior to being positioned in housing 14, there is an annular gap 90 between wall 40 and the innermost circumference 91 of seal ring 44.

Reference is now made to FIG. 5 which shows the piston assembly 35 positioned in the housing 14 of actuator 10. It should also be noted that in the condition shown in FIG. 4, set screws 72 have not been tightened against the Bellville springs 80 such that there is essentially no compressive force being exerted against compression ring 52. Although the outside diameter and circumference of the piston assembly 28 are greater than the inside diameter and circumference of surface 26, piston assembly 28 can still be forced into housing 14. As depicted in FIG. 4, seal ring 44 is in what may be considered a totally relaxed state. Thus it has a substantially circular inner circumference 91, a substantially circular outer circumference 43, an axial thickness, and a radial thickness between circumferences 91 and 43. Because of gap 90, seal ring 44 can be pushed radially inwardly which will cause seal ring 44 to "wrinkle" forming at least in part a wave like configuration such that neither the inner circumference 91 nor outer circumference 43 will be substantially circular, but will instead be wavy, to some extent, around the periphery of seal ring 44. However, the net result will be that the outer circumference of seal ring 44 will be less, because of the "wrinkles" or "waves" than the circumference formed by sealing surface 26.

Once positioned in housing 14, and as shown in FIG. 5, the set screws 72 can now be tightened which will compress the Bellville springs 80 and eventually force compression ring 52 against gasket 56, which is optional, thereby compressing seal ring 44 against support surface 42, it being understood that a suitable optional gasket 58 is disposed between seal ring 44 and support surface 42. As compression ring 44 is compressed, the volume of seal ring 44 is displaced such that it is forced into sealing contact with surface 40 and surface 26 which effectively form radially inner and radially outer sealing surfaces, respectively. In effect, the present invention has formed a compressive seal of "solid" graphite fiber.

As noted above, graphite fiber, carbon fiber, etc. are incompressible and inelastic. However, since seal ring 44, prior to being "compressed," is not technically a solid seal ring, its volume can be displaced when acted upon by a compressive force. The theory of the present invention is that while the seal ring pocket has a smaller ID and a smaller OD than that of the seal ring 44 in its relaxed state, nonetheless the volume of seal ring 44 can be forced to conform to the volume of the pocket. In effect, seal ring 44 can be displaced to a circumferential length equal to its original form length, thereby creating full, sealing contact with both the inner and outer sealing surfaces. Since seal ring 44 is initially formed by a plurality of wraps of at least one strand of a substantially incompressible and inelastic material, there are gaps, voids or the like, regardless of how minute, between the individual wraps. Thus, while an individual strand, wrap, or the like is substantially incompressible and inelastic, when seal 44 is initially formed, the gaps, interstices or the like between the individual wraps or windings can be eliminated when the seal 44 is placed in the seal pocket and subjected to compressive loading as described above. In this regard, once the seal ring is forced into the pocket in the manner described above and placed under compression, the interstices, voids, etc. between the individual wraps will be substantially eliminated, the radially inner and outer sealing surfaces fully engaged and the seal 44 will form a substantially solid annular body of the substantially incompressible and inelastic material.

While it will be apparent that seal 44 can be formed by a single, continuous strand wrapped a desired number of times to obtain a seal member of desired radial thickness and axial thickness, it will also be understood that multiple strands can be wrapped if desired.

Referring now to FIG. 3, there is shown one method an apparatus for forming a seal of the present invention utilizing the annular piston body 36 and the housing 14. An annular form member shown generally as 100 has an annular body portion 102 with an annular, radially inwardly, axially extending flange 104. Form body 102 has a series of circumferentially spaced holes 106 through which extend bolts 107 which are received in threaded bores 68 in piston body 36, the form body 102 being thus attached to piston body 36 by means of bolts 107. It will be seen that there is formed an annularly extending cavity 108 defined by form body 102, flange 104 and support surface 42 formed on piston body 36. Seal body 44 is then formed by multiple wraps or windings of a suitable incompressible and inelastic material which, as noted above, can be a single strand or multiple strands. In either event, the windings or wraps are made until seal 44 has achieved the desired volume with a predetermined axial thickness and a predetermined radial thickness. Once preformed as shown and described with respect to FIG. 3, the seal body 44 can then be placed in the piston assembly 35 shown in FIG. 4, the seal assembly 35 together with seal ring 44 being placed inside housing 14 and subjected to the compressive forces as described above with respect to FIG. 5. It will be appreciated that when form body 102 is removed from piston body 36 once seal body 44 has substantially filled the volume defined by cavity 108, seal body 44 will have an inner circumference defined by the outer circumference of flange 104. This of course is larger than the circumference of wall 40 for reasons discussed above.

Figure 6:
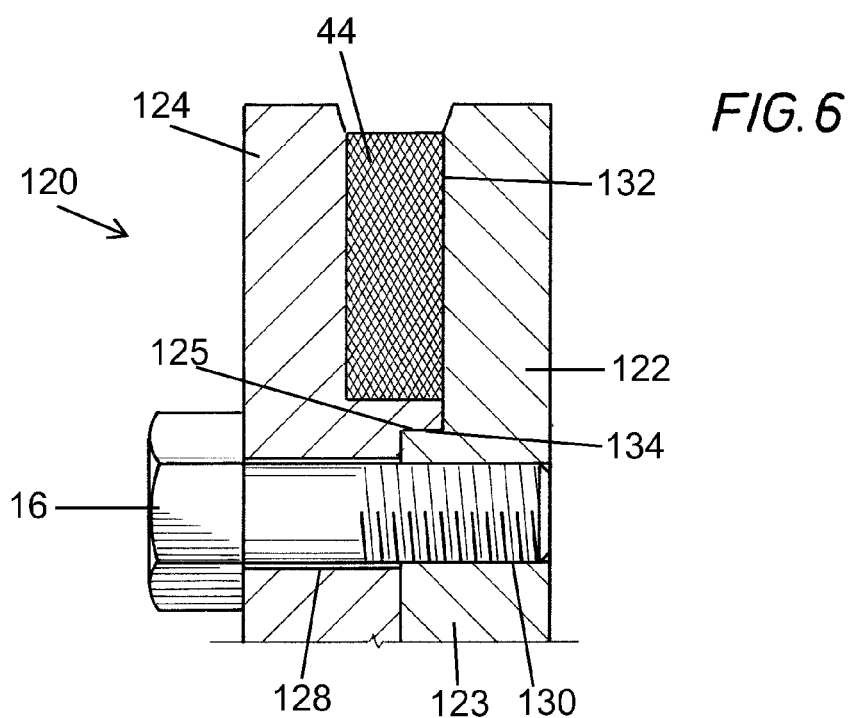
FIG. 6 is an elevational view, partly in section of a form for making a seal according to one aspect of the present invention.

With reference to FIG. 6, there is shown another method of forming the seal of the present invention employing a jig. The jig in FIG. 6 shown generally as 120 comprises an annular lower form body 122 and an annular upper form body 124, form bodies 122 and 124 being secured together by means of bolts 126 which extend through bores 128 in upper form body 124 and are received in registering, threaded bores 130 of lower form body 122. Form body 122 has a central hub 123 forming an annular, radially outwardly facing hub surface 125. Form bodies 122 and 124 form an annularly extending cavity 132, form body 124 having an annular, axially extending flange 134 which surrounds hub 123 and partially defines cavity 132. As in the case of forming the seal body in reference to FIG. 3, single or multiple strands, wraps or windings of the desired inelastic, incompressible material are made around flange 134 until cavity 132 is substantially filled to a desired outer diameter.

Form 120 can then be disassembled and seal body 44 removed. It will be recognized that flange 135 will have a radial thickness such that the inner circumference of seal body 44 is larger than the circumference of wall 40 by the desired amount. Seal body 44 thus formed can go through the assembly procedure described above with respect to FIGS. 4 and 5.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An assembly for sealing between an annular, radially outwardly facing, seating surface and an annular, radially inwardly facing, seating surface comprising:

an annular carrier having an outer periphery and forming said annular, radially outwardly facing, seating surface having a first circumference, said carrier having an annular, axially facing support surface adjacent its outer periphery, an annular recess being formed by said annular, radially outwardly facing seating surface and said annular, axially facing support surface;

a housing forming said annular, radially inwardly facing, seating surface having a second circumference;

said annular, radially outwardly facing seating surface and said annular, radially inwardly facing seating surface both having axial widths W;

an annular seal, said seal comprising an annular seal body comprised of a plurality of wraps of at least one strand of a substantially incompressible and inelastic material, an annular, axially facing first side surface, an annular, axially facing second side surface, a seal body inner circumference and a seal body outer circumference, said seal body inner circumference being greater than said first circumference, said seal body outer circumference being greater than said second circumference, said seal body having an annular, radially inwardly facing sealing surface and an annular, radially outwardly facing sealing surface, said annular, radially inwardly facing sealing surface and said annular, radially outwardly facing sealing surface both having axial thicknesses T, said seal body being positioned in said annular recess between said annular, radially outwardly facing seating surface and said annular, radially inwardly facing seating surface;

a compression ring operatively positioned on said upper surface of said seal body; and a compression assembly operatively connected to said compression ring to force said compression ring toward said support surface whereby the entire axial thicknesses T of said annular, radially inwardly facing sealing surface and said annular, radially outwardly facing sealing surface are forced into sealing engagement with the entire axial widths W of said annular, radially outwardly facing seating surface and said annular, radially inwardly facing seating surface, respectively.

2. The assembly of claim 1, further comprising a retainer ring removably secured to said carrier and overlying said compression ring.

3. The assembly of claim 2, wherein said retainer ring has a plurality of circumferentially spaced, threaded bores, said threaded bores overlying said compression ring, at least some of said threaded bores being provided with a compression screw to urge said compression ring toward said support surface.

4. The assembly of claim 3, wherein there is a spring assembly in said threaded bores positioned between said compression screws and said compression ring.

5. The assembly of claim 4, wherein said spring assembly comprises series stacked Bellville springs.

6. The assembly of claim 1, wherein there is a first gasket positioned between said compression ring and said annular seal and a second gasket positioned between said support surface and said annular seal.

7. The assembly of claim 1, wherein said compression ring has an annular, radially outwardly opening compression ring recess and there is a first anti-extrusion ring received in said compression ring recess and there is a second, annular radially outwardly opening carrier recess in said annular carrier and there is a second anti-extrusion ring positioned in said carrier recess.

8. The assembly of claim 1, wherein said incompressible and inelastic material is selected from the group consisting of graphite fibers, carbon fibers, ceramic fibers, and mixtures thereof.

9. An actuator comprising:
a housing forming a cylindrical chamber, at least a portion of the wall of said cylindrical chamber forming an annular, axially extending, radially inwardly facing seating surface;
a piston reciprocally moveable in said cylindrical chamber, said piston comprising:
a piston body connectable to a piston rod, said piston body having an annular peripheral, recess defined by an annular, axially extending radially outwardly facing seating surface and an annular, axially facing, support surface;
a seal member received in said recess, said seal member comprising an annular seal body having an axially facing first side surface and an axially facing second side surface and having a annular radially innermost circumference and an annular radially outermost circumference, said innermost circumference being greater than the circumference of said radially outwardly facing sealing surface, said outermost circumference being greater than the circumference of said radially inwardly facing sealing surface, said seal bodying having an annular, radially inwardly facing sealing surface and an annular, radially outwardly facing sealing surface, said annular, radially inwardly facing sealing surface and said annular, radially outwardly facing sealing surface both having axial thicknesses T, said seal body being comprised of a plurality of wraps of at least one strand of a substantially incompressible and inelastic material;
a compression ring, said seal body being disposed in a seal ring pocket formed by said compression ring, said support surface, said radially outwardly facing seating surface and said radially inwardly facing seating surface; and
a compression assembly operative to compress said compression ring toward said support surface whereby, the entire axial thicknesses T of said annular, radially inwardly facing sealing surface and said annular, radially outwardly facing sealing surface are displaced into sealing engagement with said radially outwardly facing seating surface and said radially inwardly facing seating surface, respectively, and said seal body forms a substantially solid mass filling said seal ring pocket.

10. The actuator of claim 9, further comprising a retainer ring removably secured to said piston body and overlying said compression ring.

11. The actuator of claim 10, wherein said retainer ring has a plurality of circumferentially spaced, threaded bores, said threaded bores overlying said compression ring, at least some of said threaded bores being provided with a compression screw to urge said compression ring toward said support surface.

12. The actuator of claim 11, wherein there is a spring assembly in said threaded bores positioned between said compression screws and said compression ring.

13. The actuator of claim 12, wherein said spring assembly comprises series stacked Bellville springs.

14. The actuator of claim 9, wherein there is a first gasket positioned between said compression ring and said annular seal and a second gasket positioned between said support surface and said annular seal.

15. The actuator of claim 9, wherein said compression ring has an annular, radially outwardly opening compression ring recess and there is a first anti-extrusion ring received in said compression ring recess and there is a second, annular radially outwardly opening, piston recess in said piston and there is a second anti-extrusion ring positioned in said piston recess.

16. The actuator of claim 9, wherein said incompressible and inelastic material is selected from the group consisting of graphite fibers, carbon fibers, ceramic fibers, and mixtures thereof.

17. An assembly for sealing an annular seal between an annular, radially outwardly facing, sealing surface and an annular, radially inwardly facing, sealing surface comprising:
an annular carrier having an outer periphery and forming said annular, radially outwardly facing, sealing surface having a first circumference, said carrier having an annular, axially facing support surface adjacent its outer periphery, an annular recess being formed by said annular, radially outwardly facing sealing surface and said annular, axially facing support surface;
a housing forming said annular, radially inwardly facing, sealing surface having a second circumference;
an annular seal, said seal comprising an annular seal body comprised of a plurality of wraps of at least one strand of a substantially incompressible and inelastic material, said seal body having an axial thickness, an annular, axially facing upper surface, an annular, axially facing lower surface, a seal body inner circumference and a seal body outer circumference, said seal body inner circumference being greater than said first circumference, said seal body outer circumference being greater than said second circumference, said seal body being positioned in said annular recess between said annular, radially outwardly facing sealing surface and said annular, radially inwardly facing sealing surface;
a compression ring operatively positioned on said upper surface of said seal body; and
a retainer ring removably secured to said carrier and overlying said compression ring, wherein said retainer ring has a plurality of circumferentially spaced, threaded bores, said threaded bores overlying said compression ring, at least some of said threaded bores being provided with a compression screw to urge said compression ring toward said support surface whereby said seal body is forced into sealing engagement with said annular, radially outwardly facing sealing surface and said annular, radially inwardly facing sealing surface.

\* \* \* \* \*